US008980965B2

(12) United States Patent
Takahashi

(10) Patent No.: US 8,980,965 B2
(45) Date of Patent: Mar. 17, 2015

(54) METHOD FOR PRODUCING POLYESTER TYPE FLEXIBLE POLYURETHANE FOAM, AND CATALYST COMPOSITION TO BE USED THEREFOR

(75) Inventor: Yoshihiro Takahashi, Shunan (JP)

(73) Assignee: Tosoh Corporation, Shunan (JP)

( * ) Notice: Subject to any disclaimer, the term of this patent is extended or adjusted under 35 U.S.C. 154(b) by 644 days.

(21) Appl. No.: 12/739,885

(22) PCT Filed: Oct. 23, 2008

(86) PCT No.: PCT/JP2008/069271
§ 371 (c)(1),
(2), (4) Date: Apr. 26, 2010

(87) PCT Pub. No.: WO2009/054472
PCT Pub. Date: Apr. 30, 2009

(65) Prior Publication Data
US 2010/0256249 A1      Oct. 7, 2010

(30) Foreign Application Priority Data
Oct. 26, 2007    (JP) .................................. 2007-279243

(51) Int. Cl.
*C08G 18/18*     (2006.01)
*C08G 18/20*     (2006.01)
(Continued)

(52) U.S. Cl.
CPC ........ *C08G 18/2027* (2013.01); *C08G 18/1825* (2013.01); *C08G 18/2018* (2013.01);
(Continued)

(58) Field of Classification Search
CPC ........... C08G 18/1825; C08G 18/2018; C08G 18/2027; C08G 2101/0008; C08G 2101/0083; C08G 18/42; C08J 9/08; C08J 2203/02; C08J 2203/10; C08J 2205/06
USPC .......................................... 521/129, 172, 164
See application file for complete search history.

(56) References Cited

U.S. PATENT DOCUMENTS 4,379,757 A     4/1983   Baskent et al.
5,104,907 A *   4/1992   Yoshimura et al. ............. 521/28
(Continued)

FOREIGN PATENT DOCUMENTS

CN         1049852 A    3/1991
CN         1311805 A    9/2001
(Continued)

OTHER PUBLICATIONS

International Preliminary Report on Patentability in PCT/JP2008/069271 dated Jun. 1, 2010.

Office Action in Chinese Application SN 200880113302.2 mailed Dec. 31, 2011.
(Continued)

*Primary Examiner* — John Cooney
(74) *Attorney, Agent, or Firm* — Nixon & Vanderhye P.C.

(57) ABSTRACT

To provide a method for producing a low-odor polyester-type flexible polyurethane foam which is excellent in formability and free from scorch in the interior of the foam, and further discharges substantially no volatile amine compound from a product, in the production of a polyester-type flexible polyurethane foam, and to provide a catalyst composition to be used for the production method.
A polyester-type flexible polyurethane foam is produced by a process which comprises reacting a polyester polyol with a polyisocyanate, in the presence of a catalyst composition containing one or more amine compounds selected from the group consisting of an amine compound represented by the following formula (1):

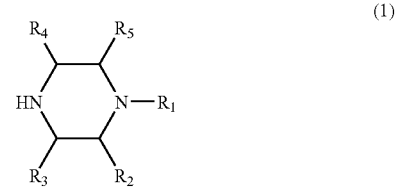

in the above formula (1), $R_1$ is a $C_{1-6}$ linear or branched alkyl group, and each of $R_2$, $R_3$, $R_4$ and $R_5$ which are independent of one another, is a hydrogen atom or a $C_{1-2}$ alkyl group,
an amine compound represented by the following formula (2):

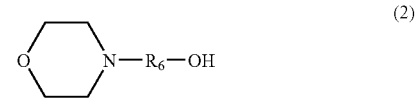

in the above formula (2), $R_6$ is a $C_{2-6}$ linear or branched alkylene group, and
an amine compound represented by the following formula (3):

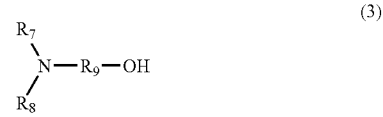

in the above formula (3), each of $R_7$ and $R_8$ which are independent of each other, is a $C_{1-4}$ alkyl group, and $R_9$ is a $C_{3-5}$ linear or branched alkylene group;
a blowing agent; and a surfactant.

3 Claims, 1 Drawing Sheet

(51) Int. Cl.
*C08G 18/42* (2006.01)
*C08G 101/00* (2006.01)

(52) U.S. Cl.
CPC ............ *C08G18/42* (2013.01); *C08G 2101/00* (2013.01); *C08G 2101/0008* (2013.01); *C08G 2101/0083* (2013.01)
USPC ........................... 521/129; 521/164; 521/172

(56) References Cited

U.S. PATENT DOCUMENTS

| | | | |
|---|---|---|---|
| 5,591,780 A | 1/1997 | Muha et al. | |
| 6,410,608 B1 | 6/2002 | Sakai et al. | |
| 6,586,485 B1* | 7/2003 | Bruchmann et al. | 521/99 |
| 6,767,929 B2* | 7/2004 | Ishikawa et al. | 521/118 |
| 7,572,837 B2 | 8/2009 | Kometani et al. | |
| 2003/0144371 A1* | 7/2003 | Kometani et al. | 521/99 |
| 2003/0191206 A1* | 10/2003 | Chang | 521/155 |

FOREIGN PATENT DOCUMENTS

| | | |
|---|---|---|
| CN | 1417244 A | 5/2003 |
| GB | 1 091 604 | 3/1964 |
| JP | 46-4846 | 11/1971 |
| JP | 4-85317 | 3/1992 |
| JP | 6-16760 | 1/1994 |
| JP | 07-258367 | 10/1995 |
| JP | 2001-26627 | 1/2001 |
| JP | 2001-172350 | 6/2001 |
| JP | 2001-172351 | 6/2001 |
| JP | 2002-179755 | 6/2002 |
| JP | 2003-137951 | 5/2003 |
| JP | 2003-206327 | 7/2003 |
| JP | 2004-27010 | 1/2004 |
| JP | 2004-238561 | 8/2004 |
| JP | 2004-359820 | 12/2004 |
| JP | 2005-29658 | 2/2005 |
| JP | 2005-171047 | 6/2005 |
| JP | 2006-45258 | 2/2006 |
| JP | 2006-45267 | 2/2006 |
| JP | 2006-160827 | 6/2006 |
| JP | 2007-23115 | 2/2007 |
| JP | 2007-77240 | 3/2007 |
| JP | 2008-56849 | 3/2008 |
| JP | 2008-195909 | 8/2008 |
| WO | 2008/023436 | 2/2008 |

OTHER PUBLICATIONS

English translation of Chinese Office Action in Serial No. CN 200880113302.2 dated Dec. 31, 2011.
International Search Report for PCT/JP2008/069271, mailed Jan. 20, 2009.
Extended European Search Report in EP 08 84 2459 dated Sep. 12, 2014.

* cited by examiner

METHOD FOR PRODUCING POLYESTER TYPE FLEXIBLE POLYURETHANE FOAM, AND CATALYST COMPOSITION TO BE USED THEREFOR

This application is the U.S. national phase of International Application No. PCT/JP2008/069271, filed 23 Oct. 2008, which designated the U.S. and claims priority to Japanese Patent Application No. 2007-279243, filed 26 Oct. 2007 the entire contents of each of which are hereby incorporated by reference.

TECHNICAL FIELD

The present invention relates to a method for producing a polyester type flexible polyurethane foam, and a catalyst composition for producing a flexible polyurethane foam to be used therefor. More particularly, it relates to a method for producing a polyester type flexible polyurethane foam which is excellent in foam formability and free from scorching (burned spot) in the interior of the foam and further which discharges substantially no volatile amine compound, and it also relates to a catalyst composition containing an amine compound for producing a flexible polyurethane foam to be used therefor.

BACKGROUND ART

Flexible polyurethane foams are foams having an open cell structure, an extremely low compression hardness and flexibility. Among them, a thick-plate type foam having a large width or a long continuous foam block is called a "slab stock" or, as abbreviated, a "slab" which is subsequently used as cut into a proper shape. Especially, a polyester type flexible polyurethane foam is light in weight and excellent in resiliency, and therefore it is widely used for products such as automobiles, household furniture, bedding, cushions or clothing.

A polyurethane foam is produced by reacting a polyisocyanate and a polyol in the presence of a catalyst and, if necessary, a blowing agent or a surfactant, and further if necessary, other additives such as cross linking agents. In the production of a polyester type flexible polyurethane foam, usually, a polyester polyol is used as the polyol, and an amine type catalyst or a combination of the amine type catalyst and a tin type catalyst is used as the catalyst, so as to produce a good foam.

In order to produce a polyester type flexible polyurethane foam having good foam formability (shrinkage and deformation) without occurrence of scorching in the foam, a specific amine compound is used as the catalyst. For example, N-methylmorpholine, N-ethylmorpholine or 1,4-dimethylpiperazine is known.

However, in a case where the above amine compound is used as the catalyst for a polyester type flexible polyurethane foam, the amine compound remains in a free-form in a made foam and is gradually discharged as a volatile amine, and therefore a product tends to have odor problems.

As a method for solving such a problem, proposed is a method for producing a polyurethane foam by using e.g. N-methylimidazole or 1,2-dimethylimidazole as a low amine odor catalyst, instead of the above amine compounds (see e.g. Patent Document 1.)

Further, proposed is a method of using an amine compound having primary and secondary amino groups or a hydroxyalkyl group, reactive with a polyisocyanate, in its molecule, for producing the polyurethane foam (for example, see Patent Documents 2 to 5.)

According to the above Patent Documents, such amine compounds are fixed in the polyurethane resin structure, in such a form as reacted with the polyisocyanate, whereby it is possible to avoid the above problem.

However, if such amine compounds having the reactive groups in their molecules are used for producing a polyester type flexible polyurethane foam, there was a problem that a good foam cannot be made due to shrinkage of the foam or occurrence of scorching in the interior of the foam.

On the other hand, it has been known that in a method for producing a polyether type flexible polyurethane foam by using a polyether polyol as the polyol, a tin catalyst (such as stannous octoate) and a tertiary amine catalyst (such as hydroxyethyl morpholine or dimethyl isopropanol amine) are used in combination as catalysts (see Patent Document 6). However, it has been unknown to use the hydroxyethyl morpholine or dimethyl isopropanol amine as a catalyst for a polyether type flexible polyurethane foam, without the combined use with a tin catalyst.

Patent Document 1: JP-A-7-258367
Patent Document 2: JP-A-46-4846
Patent Document 3: JP-A-4-85317
Patent Document 4: JP-A-2003-206327
Patent Document 5: JP-A-2004-27010
Patent Document 6: U.K. Patent No. 1,091,604

DISCLOSURE OF THE INVENTION

Objects to be Accomplished by the Invention

The present invention has been made under the above background art, and it is an object of the present invention to provide a method for producing a low-odor polyester type flexible polyurethane foam which is excellent in foam formability and free from scorching in the interior of the foam and further which discharges substantially no volatile amine compound from a product, and it is also an object to provide a catalyst composition to be used for the production method.

Means to Accomplish the Objects

The present inventors have conducted extensive studies to accomplish the above objects. As a result, it has been found that when a specific amine compound is used as a catalyst at the time of producing a polyester type flexible polyurethane foam, it is possible to obtain a low odor polyester type flexible polyurethane foam which is excellent in foam formability and free from scorching in the interior of the foam and further which discharges substantially no volatile amine compound, and the present invention has been accomplished on the basis of these discoveries.

That is, the present invention is directed to a method for producing a polyester type flexible polyurethane foam, and a catalyst composition containing an amine compound for producing a polyester type flexible polyurethane foam, as follows:

(1) A method for producing a polyester type flexible polyurethane foam, which comprises reacting a polyester polyol with a polyisocyanate, in the presence of a catalyst composition containing one or more amine compounds selected from the group consisting of an amine compound represented by the following formula (1):

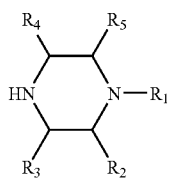

in the above formula (1), $R_1$ is a $C_{1-6}$ linear or branched alkyl group, and each of $R_2$, $R_3$, $R_4$ and $R_5$ which are independent of one another, is a hydrogen atom or a $C_{1-2}$ alkyl group, an amine compound represented by the following formula (2):

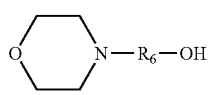

in the above formula (2), $R_6$ is a $C_{2-6}$ linear or branched alkylene group, and an amine compound represented by the following formula (3):

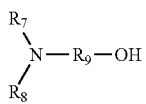

in the above formula (3), each of $R_7$ and $R_8$ which are independent of each other, is a $C_{1-4}$ alkyl group, and $R_9$ is a $C_{3-5}$ linear or branched alkylene group;

a blowing agent; and a surfactant.

(2) The method for producing a polyester-type flexible polyurethane foam according to the above (1), wherein the catalyst composition is a catalyst composition containing the amine compound represented by the formula (1) and the amine compound represented by the formula (2), and a blend ratio thereof is (the amine compound represented by the formula (1))/(the amine compound represented by the formula (2))=20/80 to 80/20 (weight ratio).

(3) The method for producing a polyester-type flexible polyurethane foam according to the above (1), wherein the catalyst composition is a catalyst composition containing the amine compound represented by the formula (1) and the amine compound represented by the formula (3), and a blend ratio thereof is (the amine compound represented by the formula (1))/(the amine compound represented by the formula (3))=20180 to 80/20 (weight ratio).

(4) The method for producing a polyester-type flexible polyurethane foam according to the above (1), wherein the catalyst composition is a catalyst composition containing the amine compound represented by the formula (2) and the amine compound represented by the formula (3), and a blend ratio thereof is (the amine compound represented by the formula (2))/(the amine compound represented by the formula (3))=20/80 to 80/20 (weight ratio).

(5) The method for producing a polyester-type flexible polyurethane foam according to the above (1), wherein the catalyst composition is a catalyst composition containing the amine compound represented by the formula (1), the amine compound represented by the formula (2) and the amine compound represented by the formula (3), and a blend ratio thereof is (the amine compound represented by the formula (1))/(the amine compound represented by the formula (2))/(the amine compound represented by the formula (3))=10 to 45/10 to 45/10 to 45 (weight ratio).

(6) The method for producing a polyester-type flexible polyurethane foam according to any one of the above (1) to (3) and (5), wherein the amine compound represented by the formula (1) is one or more amine compounds selected from the group consisting of 1-methylpiperazine, 1-ethylpiperazine, 1-propylpiperazine, 1-isopropylpiperazine, 1-butylpiperazine, 1-(1-methylpropyl)piperazine, 1-(2-methylpropyl)piperazine, 1,2-dimethylpiperazine, 1,2,5-trimethylpiperazine and 1,2,6-trimethylpiperazine.

(7) The method for producing a polyester-type flexible polyurethane foam according to any one of the above (1), (2), (4) and (5), wherein the amine compound represented by the formula (2) is one or more amine compounds selected from the group consisting of N-(2-hydroxyethyl) morpholine, N-(3-hydroxypropyl) morpholine, N-(2-hydroxypropyl) morpholine, N-(2-hydroxy-1-methylethyl) morpholine, N-(4-hydroxybutyl) morpholine, N-(3-hydroxy-1-methylpropyl) morpholine, N-(3-hydroxy-2-methylpropyl) morpholine, N-(2-hydroxybutyl) morpholine and N-(1-hydroxymethylpropyl) morpholine.

(8) The method for producing a polyester-type flexible polyurethane foam according to any one of the above (1), (3), (4) and (5), wherein the amine compound represented by the formula (3) is one or more amine compounds selected from the group consisting of N,N-dimethyl-3-hydroxypropylamine, N,N-dimethyl-2-hydroxypropylamine, N,N-dimethyl-(2-hydroxy-1-methylethyl)amine, N,N-dimethyl-(4-hydroxybutyl)amine, N,N-dimethyl-(3-hydroxy-1-methylpropyl)amine, N,N-dimethyl-(3-hydroxy-2-methylpropyl)amine, N,N-dimethyl-(2-hydroxybutyl)amine and N,N-dimethyl-(1-hydroxymethylpropyl)amine, (9) The method for producing a polyester-type flexible polyurethane foam according to any one of the above (1) to (5), wherein the catalyst composition contains one or more amine compounds selected from the group consisting of 1-methypiperazine, N-(2-hydroxyethyl) morpholine, N-(2-hydroxy-1-methylethyl) morpholine and N,N-dimethyl-(2-hydroxy-1-methylethyl)amine.

(10) A catalyst composition for producing a polyester-type flexible polyurethane foam containing an amine compound represented by the following formula (1):

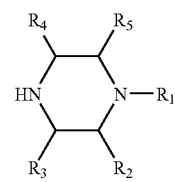

in the above formula (1), $R_1$ is a $C_{1-6}$ linear or branched alkyl group, and each of $R_2$, $R_3$, $R_4$ and $R_5$ which are independent of one another, is a hydrogen atom or a $C_{1-2}$ alkyl group.

(11) The catalyst composition for producing a polyester-type flexible polyurethane foam according to the above (10), which contains the amine compound represented by the above formula (1), and one or more amine compounds selected from the group consisting of an amine compound represented by the following formula (2):

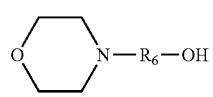

in the above formula (2), $R_6$ is a $C_{2-6}$ linear or branched alkylene group, and
an amine compound represented by the following formula (3):

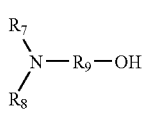

in the above formula (3), each of $R_7$ and $R_8$ which are independent of each other, is a $C_{1-4}$ alkyl group, and $R_9$ is a $C_{3-5}$ linear or branched alkylene group.

(12) The catalyst composition for producing a polyester-type flexible polyurethane foam according to the above (11), which is a catalyst composition containing the amine compound represented by the formula (1) and the amine compound represented by the formula (2), and a mixed ratio thereof is (an amine compound represented by the formula (1))/(the amine compound represented by the formula (2)) =20/80 to 80/20 (weight ratio).

(13) The catalyst composition for producing a polyester-type flexible polyurethane foam according to the above (11), which is a catalyst composition containing the amine compound represented by the formula (1) and the amine compound represented by the formula (3), and the mixed ratio is (an amine compound represented by the formula (1))/(the amine compound represented by the formula (3))=20/80 to 80/20 (weight ratio).

(14) The catalyst composition for producing a polyester-type flexible polyurethane foam according to the above (11), which is a catalyst composition containing the amine compound represented by the formula (1), the amine compound represented by the formula (2) and the amine compound represented by the formula (3), and a mixed ratio thereof is (an amine compound represented by the formula (1))/(an amine compound represented by the formula (2))/(the amine compound represented by the formula (3))=10 to 45/10 to 45/10 to 45 (weight ratio).

(15) The catalyst composition for producing a polyester-type flexible polyurethane foam according to any one of the above (10) to (14), wherein the amine compound represented by the formula (1) is one or more amine compounds selected from the group consisting of 1-methylpiperazine, 1-ethylpiperazine, 1-propylpiperazine, 1-isopropylpiperazine, 1-butylpiperazine, 1-(1-methylpropyl)piperazine, 1-(2-methylpropyl)piperazine, 1,2-dimethylpiperazine, 1,2,5-trimethylpiperazine and 1,2,6-trimethylpiperazine.

(16) The catalyst composition for producing a polyester-type flexible polyurethane foam according to the above (11), (12) or (14), wherein the amine compound represented by the formula (2) is one or more amine compounds selected from the group consisting of N-(2-hydroxyethyl) morpholine, N-(3-hydroxypropyl) morpholine, N-(2-hydroxypropyl) morpholine, N-(2-hydroxy-1-methylethyl) morpholine, N-(4-hydroxybutyl) morpholine, N-(3-hydroxy-1-methylpropyl) morpholine, N-(3-hydroxy-2-methylpropyl) morpholine, N-(2-hydroxybutyl) morpholine and N-(1-hydroxymethylpropyl) morpholine.

(17) The catalyst composition for producing a polyester-type flexible polyurethane foam according to the above (11), (13) or (14) wherein the amine compound represented by the formula (3) is one or more amine compounds selected from the group consisting of N,N-dimethyl-3-hydroxypropylamine, N,N-dimethyl-2-hydroxypropylamine, N,N-dimethyl-(2-hydroxy-1-methylethyl)amine, N,N-dimethyl-(4-hydroxybutyl)amine, N,N-dimethyl-(3-hydroxy-1-methylpropyl)amine, N,N-dimethyl-(3-hydroxy-2-methylpropyl)amine, N,N-dimethyl-(2-hydroxybutyl)amine and N,N-dimethyl-(1-hydroxymethylpropyl)amine.

(18) The catalyst composition for producing a polyester-type flexible polyurethane foam according to the above (10), which contains 1-methylpiperazine.

(19) The catalyst composition for producing a polyester-type flexible polyurethane foam according to any one of the above (11) to (14), which contains 1-methylpiperazine, and one or more amine compounds selected from the group consisting of N-(2-hydroxyethyl) morpholine, N-(2-hydroxy-1-methylethyl) morpholine and N,N-dimethyl-(2-hydroxy-1-methylethyl)amine.

Advantageous Effect of Invention

When the catalyst composition of the present invention is used as a catalyst at the time of producing a polyester type flexible polyurethane foam, it is possible to obtain a low odor polyester type flexible polyurethane foam which is excellent in foam formability and free from scorching in the interior of the foam and further which discharges substantially no volatile amine compound, and therefore the catalyst composition of the present invention is extremely useful in industry.

BEST MODE FOR CARRYING OUT THE INVENTION

Figure 1:
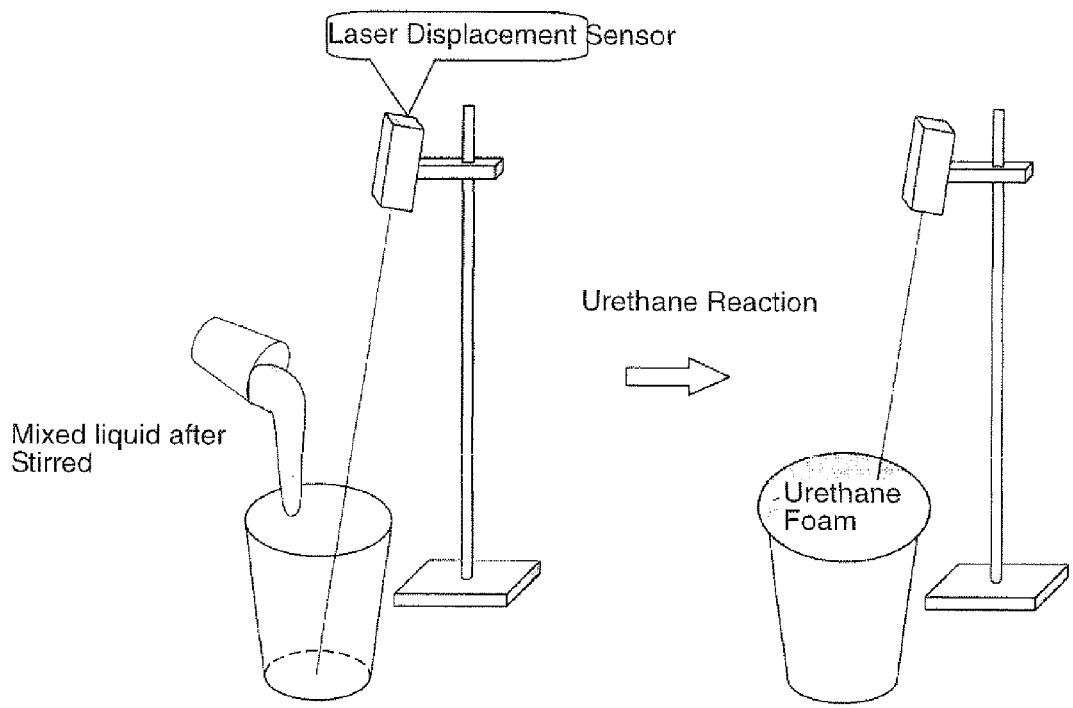
FIG. 1 is a schematic view illustrating a method of measuring a rise time in Examples of the present invention.

Now, the present invention will be described in detail.
The catalyst composition to be used for the method for producing a polyester-type flexible polyurethane foam according to the present invention is a composition containing one or more amine compounds selected from the group consisting of an amine compound represented by the above formula (1), an amine compound represented by the above formula (2) and an amine compound represented by the above formula (3).

The amine compound of the formula (1) of the present invention is not particularly limited, but may, for example, be 1-methylpiperazine (hereinafter, sometimes referred to as "N-methylpiperazine"), 1-ethylpiperazine, 1-propylpiperazine, 1-isopropylpiperazine, 1-butylpiperazine, 1-(1-methylpropyl)piperazine, 1-(2-methylpropyl)piperazine, 1-pentylpiperazine, 1-(2-methylbutyl)piperazine, 1-hexylpiperazine, 1-(2-methylpentyl)piperazine, 1-(3-methylpentyl)piperazine, 1,2-dimethylpiperazine, 1-ethyl-2-methylpiperazine, 2-methyl-1-propylpiperazine, 1-isopropyl-2-methylpiperazine, 1-butyl-2-methylpiperazine, 2-methyl-1-(1-methylpropyl)piperazine, 2-methyl-1-(2-methylpropyl)piperazine, 2-methyl-1-pentylpiperazine, 2-methyl-1-(2-methylbutyl)piperazine, 1-hexyl-2-methylpiperazine, 2-methyl-1-(2-methylpentyl)piperazine, 2-methyl-1-(3-methylpentyl)piperazine, 1,3-dimethylpiperazine, 1-ethyl-3-methylpiperazine, 3-methyl-1-propylpiperazine, 1-isopropyl-3-methylpiperazine, 1-butyl-3-methylpiperazine, 3-methyl-1-(1-methylpropyl)piperazine, 3-methyl-1-(2-methylpropyl)piperazine, 3-methyl-1-pentylpiperazine, 3-methyl-1-(2-methylbutyl)piperazine, 1-hexyl-3-methylpiperazine, 3-methyl-1-(2-methylpentyl)piperazine, 3-methyl-1-(3-methylpentyl)piperazine, 2-ethyl-1-methylpiperazine, 1,2-diethylpiperazine, 2-ethyl-1-propylpiperazine, 1-isopropyl-2-ethylpiperazine, 1-butyl-2-ethylpiperazine, 2-ethyl-1-(1-methylpropyl)piperazine, 2-ethyl-1-(2-methylpropyl)piperazine, 2-ethyl-1-pentylpiperazine, 2-ethyl-1-(2-methylbutyl)piperazine, 2-ethyl-1-hexylpiperazine, 2-ethyl-1-(2-methylpentyl)piperazine, 2-ethyl-1-(3-methylpentyl)piperazine, 3-ethyl-1-methylpiperazine, 1,3-diethylpiperazine, 3-ethyl-1-propylpiperazine, 1-isopropyl-3-ethylpiperazine, 1-butyl-3-ethylpiperazine, 3-ethyl-1-(1-methylpropyl)piperazine, 3-ethyl-1-(2-methylpropyl)piperazine, 3-ethyl-1-pentylpiperazine, 3-ethyl-1-(2-methylbutyl)piperazine, 3-ethyl-1-hexylpiperazine, 3-ethyl-1-(2-methylpentyl)piperazine, 3-ethyl-1-(3-methylpentyl)piperazine, 1,2,3-trimethylpiperazine, 1-ethyl-2,3-dimethylpiperazine, 2,3-dimethyl-1-propylpiperazine, 1-isopropyl-2,3-dimethylpiperazine, 1-butyl-2,3-dimethylpiperazine, 2,3-dimethyl-1-(1-methylpropyl)piperazine, 2,3-dimethyl-1-(2-methylpropyl)piperazine, 2,3-dimethyl-1-pentylpiperazine, 2,3-dimethyl-1-(2-methylbutyl)piperazine, 1-hexyl-2,3-dimethylpiperazine, 2,3-dimethyl-1-(2-methylpentyl)piperazine, 2,3-dimethyl-1-(3-methylpentyl)piperazine, 1,2,5-trimethylpiperazine, 1-ethyl-2,5-dimethylpiperazine, 2,5-dimethyl-1-propylpiperazine, 1-isopropyl-2,5-dimethylpiperazine, 1-butyl-2,5-dimethylpiperazine, 2,5-dimethyl-1-(1-methylpropyl)piperazine, 2,5-dimethyl-1-(2-methylpropyl)piperazine, 2,5-dimethyl-1-pentylpiperazine, 2,5-dimethyl-1-(2-methylbutyl)piperazine, 1-hexyl-2,5-dimethylpiperazine, 2,5-dimethyl-1-(2-methylpentyl)piperazine, 2,5-dimethyl-1-(3-methylpentyl)piperazine, 1,2,6-trimethylpiperazine, 1-ethyl-2,6-dimethylpiperazine, 2,6-dimethyl-1-propylpiperazine, 1-isopropyl-2,6-dimethylpiperazine, 1-butyl-2,6-dimethylpiperazine, 2,6-dimethyl-1-(1-methylpropyl)piperazine, 2,6-dimethyl-1-(2-methylpropyl)piperazine, 2,6-dimethyl-1-pentylpiperazine, 2,6-dimethyl-1-(2-methylbutyl)piperazine, 1-hexyl-2,6-dimethylpiperazine, 2,6-dimethyl-1-(2-methylpentyl)piperazine, 2,6-dimethyl-1-(3-methylpentyl)piperazine, 1,3,5-trimethylpiperazine, 1-ethyl-3,5-dimethylpiperazine, 3,5-dimethyl-1-propylpiperazine, 1-isopropyl-3,5-dimethylpiperazine, 1-butyl-3,5-dimethylpiperazine, 3,5-dimethyl-1-(1-methylpropyl)piperazine, 3,5-dimethyl-1-(2-methylpropyl)piperazine, 3,5-dimethyl-1-pentylpiperazine, 3,5-dimethyl-1-(2-methylbutyl)piperazine, 1-hexyl-3,5-dimethylpiperazine, 3,5-dimethyl-1-(2-methylpentyl)piperazine or 3,5-dimethyl-1-(3-methylpentyl)piperazine.

Among them, 1-methylpiperazine, 1-ethylpiperazine, 1-propylpiperazine, 1-isopropylpiperazine, 1-butylpiperazine, 1-(1-methylpropyl)piperazine, 1-(2-methylpropyl)piperazine, 1,2-dimethylpiperazine, 1,2,5-trimethylpiperazine and 1,2,6-trimethylpiperazine are more preferred in view of the high catalytic activity.

The amine compound of the formula (2) of the present invention is not particularly limited, but may, for example, be N-(2-hydroxyethyl)morpholine, N-(3-hydroxypropyl)morpholine, N-(2-hydroxypropyl)morpholine, N-(2-hydroxy-1-methylethyl)morpholine (hereinafter sometimes referred to as "N-hydroxyisopropylmorpholine"), N-(4-hydroxybutyl)morpholine, N-(3-hydroxy-1-methylpropyl)morpholine, N-(3-hydroxy-2-methylpropyl)morpholine, N-(2-hydroxybutyl)morpholine, N-(3-hydroxybutyl)morpholine, N-(1-hydroxymethylpropyl)morpholine, N-(5-hydroxypentyl)morpholine, N-(4-hydroxy-1-methylbutyl)morpholine, N-(4-hydroxy-2-methylbutyl)morpholine, N-(4-hydroxy-3-methylbutyl)morpholine, N-(4-hydroxypentyl)morpholine, N-(3-hydroxy-2-methylbutyl)morpholine, N-(6-hydroxyhexyl)morpholine, N-(5-hydroxy-1-methylpentyl)morpholine, N-(5-hydroxy-2-methylpentyl)morpholine, N-(5-hydroxy-3-methylpentyl)morpholine, N-(4-hydroxymethylpentyl)morpholine or N-(2-ethyl-4-hydroxybutyl)morpholine.

Among them, from the viewpoint of the high catalytic activity, N-(2-hydroxyethyl)morpholine, N-(3-hydroxypropyl)morpholine, N-(2-hydroxypropyl)morpholine, N-(2-hydroxy-1-methylethyl)morpholine, N-(4-hydroxybutyl)morpholine, N-(3-hydroxy-1-methylpropyl)morpholine, N-(3-hydroxy-2-methylpropyl)morpholine, N-(2-hydroxybutyl)morpholine and N-(1-hydroxymethylpropyl)morpholine are more preferred.

The amine compound of the formula (3) of the present invention is not particularly limited, but may, for example, be N,N-dimethyl-3-hydroxypropylamine, N,N-dimethyl-2-hydroxypropylamine, N,N-dimethyl-(2-hydroxy-1-methylethyl)amine (hereinafter sometimes referred to as "N,N-dimethylisopropanolamine"), N,N-dimethyl-(4-hydroxybutyl)amine, N,N-dimethyl-(3-hydroxy-1-methylpropyl)amine, N,N-dimethyl-(3-hydroxy-2-methylpropyl)amine, N,N-dimethyl-(2-hydroxybutyl)amine, N,N-dimethyl-(3-hydroxybutyl)amine, N,N-dimethyl-(1-hydroxymethylpropyl)amine, N,N-dimethyl-(5-hydroxypentyl)amine, N,N-dimethyl-(4-hydroxy-1-methylbutyl)amine, N,N-dimethyl-(4-hydroxy-2-methylbutyl)amine, N,N-dimethyl-(4-hydroxy-3-methylbutyl)amine, N,N-dimethyl-(4-hydroxypentyl)amine, N,N-dimethyl-(3-hydroxy-2-methylbutyl)amine, N,N-diethyl-3-hydroxypropylamine, N,N-diethyl-2-hydroxypropylamine, N,N-diethyl-(2-hydroxy-1-methylethyl)amine, N,N-diethyl-(4-hydroxybutyl)amine, N,N-diethyl-(3-hydroxy-1-methylpropyl)amine, N,N-diethyl-(3-hydroxy-2-methylpropyl)amine, N,N-diethyl-(3-hydroxybutyl)amine, N,N-diethyl-(1-hydroxymethylpropyl)amine, N,N-diethyl-(5-hydroxypentyl)amine, N,N-diethyl-(4-hydroxy-1-methylbutyl)amine, N,N-diethyl-(4-hydroxy-2-methylbutyl)amine, N,N-diethyl-(4-hydroxy-3-methylbutyl)amine, N,N-diethyl-(4-hydroxypentyl)amine, N,N-diethyl-(3-hydroxy-2-methylbutyl)amine, N,N-dipropyl-3-hydroxypropylamine, N,N-dipropyl-2-hydroxypropylamine, N,N-dipropyl-(2-hydroxy-1-methylethyl)amine N,N-dipropyl-(4-hydroxybutyl)amine, N,N-dipropyl-(3-hydroxy-1-methylpropyl)amine, N,N-dipropyl-(3-hydroxy-2-methylpropyl)amine, N,N-dipropyl-(3-hydroxybutyl)amine, N,N-dipropyl-(1-hydroxymethylpropyl)amine, N,N-dipropyl-(5-hydroxypentyl)amine, N,N-dipropyl-(4-hydroxy-1-methylbutyl)amine, N,N-dipropyl-(4-hydroxy-2-methylbutyl)amine, N,N-dipropyl-(4-hydroxy-3-methylbutyl)amine, N,N-dipropyl-(4-hydroxypentyl)amine, N,N-dipropyl-(3-hydroxy-2-methylbutyl)amine, N,N-dibutyl-3-hydroxypropylamine, N,N-dibutyl-2-hydroxypropylamine, N,N-dibutyl-(2-hydroxy-1-methylethyl)amine N,N-dibutyl-(4-hydroxybutyl)amine, N,N-dibutyl-(3-hydroxy-1-methylpropyl)amine, N,N-dibutyl-(3-hydroxy-2-methylpropyl)amine, N,N-dibutyl-(3-hydroxybutyl)amine, N,N-dibutyl-(1-hydroxymethylpropyl)amine, N,N-dibutyl-(5-hydroxypentyl)amine, N,N-dibutyl-(4-hydroxy-1-methylbutyl)amine, N,N-dibutyl-(4-hydroxy-2-methylbutyl) amine, N,N-dibutyl-(4-hydroxy-3-methylbutyl)amine, N,N-dibutyl-(4-hydroxypentyl)amine or N,N-dibutyl-(3-hydroxy-2-methylbutyl)amine.

Among them, from the viewpoint of the high catalytic activity, N,N-dimethyl-3-hydroxypropylamine, N,N-dimethyl-2-hydroxypropylamine, N,N-dimethyl-(2-hydroxy-1-methylethyl)amine, N,N-dimethyl-(4-hydroxybutyl)amine, N,N-dimethyl-(3-hydroxy-1-methylpropyl)amine, N,N-dimethyl-(3-hydroxy-2-methylpropyl)amine, N,N-dimethyl-(2-hydroxybutyl)amine and N,N-dimethyl-(1-hydroxymethylpropyl)amine are more preferred.

Each amine compound represented by the above formula (1), (2) or (3) as a component of the catalyst composition to be used in the method of the present invention may readily be produced by a method known by literature.

The above amine compound represented by the formula (1) may, for example, be produced by reacting an aldehyde or a corresponding glycol with a corresponding amine compound having a piperazine structure.

The above amine compound represented by the formula (2) may, for example, be obtained by a method of reacting an alkylene oxide such as ethylene oxide or propylene oxide with morpholine. Further, it may also be produced by a method of reacting morpholine with a corresponding glycol.

The above amine compound represented by the formula (3) may, for example, be produced by reacting a corresponding dialkylamine with an alkylene oxide or a glycol.

The catalyst composition to be used in the production method of the present invention contains one or more amine compounds selected from the group consisting of an amine compound represented by the above formula (1), an amine compound represented by the above formula (2) and an amine compound represented by the above formula (3), but such amine compounds may be used alone or as optionally mixed.

In the product of a polyester type flexible polyurethane foam, the catalyst composition used in the production method of the present invention is fixed in the skeleton of the polyurethane resin and is not substantially present as a free amine compound, and therefore it would not be discharged as a volatile amine compound. Accordingly, it is possible to prevent odor due to volatilization of the amine compound.

The method for producing a polyester type flexible polyurethane foam of the present invention is characterized in that when a polyester type flexible polyurethane foam is produced by reacting a polyester polyol with a polyisocyanate in the presence of a catalyst, a blowing agent and a surfactant, the above-mentioned catalyst composition of the present invention is used as the catalyst.

Products using the polyester type flexible polyurethane foam obtainable may, for example, be automobiles, household furniture, bedding, cushions or clothing.

As the polyester polyol to be used for the method for producing a polyester type flexible polyurethane foam of the present invention, it is possible to use a conventional polyester polyol. For example, a polyester polyol obtainable by reacting a dicarboxylic acid and/or a monocarboxylic acid with an excess diol and/or polyhydroxy alcohol, may be mentioned.

Specifically, a polyester polyol obtainable by reacting a dicarboxylic acid and/or a monocarboxylic acid, such as adipic acid, glutaric acid, succinic acid or an anhydride thereof, or an aliphatic acid (such as linoleic acid or oleic acid), with a diol and/or a polyhydroxy alcohol, such as diethylene glycol, ethylene glycol, dipropylene glycol, propylene glycol, 1,4-butanediol, trimethylolpropane or pentaerythritol, is exemplified.

As such a polyester polyol, one having a weight average molecular weight within a range of from 100 to 5,000 may be employed. Preferred is a polyester polyol having a weight average molecular weight within a range of from 1,000 to 3,000.

The polyisocyanate to be used for the production method of the present invention may be a conventional one, and it may, for example, be an aromatic polyisocyanate such as toluene diisocyanate (TDI), diphenylmethane diisocyanate (MDI), naphthylene diisocyanate or xylylene diisocyanate; an aliphatic polyisocyanate such as hexamethylene diisocyanate; an aliphatic polyisocyanate such as hexamethylene diisocyanate; an alicyclic polyisocyanate such as dicyclohexyl diisocyanate or isophorone diisocyanate; or a mixture thereof. TDI or its derivative may, for example, be a mixture of 2,4-toluene diisocyanate and 2,6-toluene diisocyanate, or a terminal isocyanate prepolymer derivative of TDI. Among polyisocyanates, 2,4-toluene diisocyanate, 2,6-toluene diisocyanate and mixtures thereof are preferably used.

In the production method of the present invention, the ratio of such a polyisocyanate to the polyester polyol to be used is not particularly limited, but when it is represented by an isocyanate index (isocyanate groups/active hydrogen groups reactive with the isocyanate groups), it is usually within a range of from 60 to 130, preferably within a range of from 80 to 120.

In the production method of the present invention, when the above amine compound represented by the formula (1) is singly used for the method for producing a polyester type flexible polyurethane foam, it is possible to obtain a low-odor polyester type flexible polyurethane foam which is excellent in the foam formability and free from scorching in the interior of the foam, and further which discharges substantially no volatile amine. However, it is difficult to handle the above amine compound represented by the formula (1), and therefore it is more preferred to use it as a mixture with the above amine compound represented by the formula (2) and/or the above amine compound represented by the formula (3). The mixed ratio is usually (the above amine compound represented by the formula (1))/(the above amine compound represented by the formula (2))=20/80 to 80/20 (weight ratio), preferably from 30/70 to 70/30 (weight ratio). Further, it is usually (the above amine compound represented by the formula (1))/(the amine compound represented by the formula (3))=20/80 to 80/20 (weight ratio), preferably from 30/70 to 70/30 (weight ratio).

In the production method of the present invention, when the above amine compound represented by the formula (2) is singly used for the method for producing a polyester type flexible polyurethane foam, it is possible to obtain a low-odor polyester type flexible polyurethane foam which is excellent in the foam formability and free from scorching in the interior of the foam, and further which discharges substantially no volatile amine. However, the above amine compound represented by the formula (2) has a low catalytic activity as a catalyst itself, and therefore it is more preferred to use it as a mixture with the above amine compound represented by the formula (1) and/or the above amine compound represented by the formula (3). The mixed ratio is usually (the above amine compound represented by the formula (2))/(the above amine compound represented by the formula (1))=20/80 to 80/20 (weight ratio), preferably from 30/70 to 70/30 (weight ratio). Further, it is usually (the above amine compound represented by the formula (2))/(the above amine compound represented by the formula (3))=20180 to 80/20 (weight ratio), preferably from 30/70 to 70/30 (weight ratio).

In the production method of the present invention, when the above amine compound represented by the formula (3) is singly used for the method for producing a polyester type flexible polyurethane foam, it is possible to obtain a low-odor polyester type flexible polyurethane foam which is excellent in the foam formability and free from scorching in the interior of the foam, and further which discharges substantially no volatile amine. However, the above amine compound represented by the formula (3) has a strong odor as a catalyst itself, and therefore it is more preferred to use it as a mixture with the above amine compound represented by the formula (1) and/or the above amine compound represented by the formula (2). The mixed ratio is usually (the above amine compound represented by the formula (3))/(the above amine compound represented by the formula (1))=20/80 to 80/20 (weight ratio), preferably from 30/70 to 70/30 (weight ratio). Further, it is usually (the above amine compound represented by the formula (3))/(the above amine compound represented by the formula (2))=20/80 to 80/20 (weight ratio), preferably from 30/70 to 70/30 (weight ratio).

In the present invention, when the above amine compound represented by the formula (1), the above amine compound represented by the formula (2) and the above amine compound represented by the formula (3) are used as a mixture, the mixed ratio is usually (the amine compound represented by the formula (1))/(the amine compound represented by the formula (2))/(the amine compound represented by the formula (3))=10 to 45/10 to 45/10 to 45 (weight ratio), preferably 20 to 40/20 to 40/20 to 40 (weight ratio).

The amount of the catalyst composition of the present invention to be used for producing a polyester type flexible polyurethane foam, is usually within a range of from 0.01 to 10 parts by weight, preferably from 0.05 to 5 parts by weight, per 100 parts by weight of the polyol to be used. If the catalyst composition of the present invention is used in such a large amount as to exceed the above range, there is a lack of the compatibility with a production line of the polyester type flexible polyurethane foam, and further the amount of the volatile amine also increases, such being undesirable.

The catalyst to be used for the method for producing a polyester type flexible polyurethane foam of the present invention is the above catalyst composition of the present invention, but in addition, it is possible to use other catalysts in combination without departing from the present invention. Such other catalysts may, for example, be conventional organic metal catalysts and amine type catalysts.

The organic metal catalysts may be conventional ones and are not particularly limited, and for example, stannous diacetate, stannous dioctoate, stannous dioleate, stannous dilaurate, dibutyltin oxide, dibutyltin diacetate, dibutyltin dilaurate, dibutyltin dichloride, dioctyltin dilaurate, lead octanoate, lead naphthenate, nickel naphthenate and cobalt naphthenate may be mentioned. Among them, stannous dioctoate may suitably be used.

The amine type catalysts may be conventional ones and are not particularly limited, and for example, tertiary amine compounds such as N,N,N',N'-tetramethylethylenediamine, N,N,N',N'-tetramethylpropylenediamine, N,N,N',N'',N''-pentamethyldiethylentriamine, N,N,N',N'',N''-pentamethyl-(3-aminopropyl)ethylenediamine, N,N,N',N'',N''-pentamethyldipropylenetriamine, N,N,N',N'-tetramethylguanidine, 1,3,5-tris(N,N-dimethylaminopropyl)hexahydro-S-triazine, 1,8-diazabicyclo[5.4.0]undecene-7, triethylenediamine, N,N,N',N'-tetramethylhexamethylenediamine, N-methyl-N'-(2-dimethylaminoethyl)piperazine, N,N'-dimethylpiperazine, dimethylcyclohexylamine, N-methylmorpholine, N-ethylmorpholine, bis(2-dimthylaminoethyl)ether, 1-methylimidazole, 1,2-dimethylimidazole, 1-isobutyl-2-methylimidazole and 1-dimethylaminopropylimidazol, may be mentioned. Further, it is also possible to use a tertiary amine compound having a reactive group, other than the above amine compound represented by the formula (1), (2) or (3), and for example, 1-(2-hydroxyethyl)imidazole, 1-(2-hydroxypropyl)imidazole, 1-(2-hydroxyethyl)-2-methylimidazole, 1-(2-hydroxypropyl)-2-methylimidazole or 3-quinuclidinol may be mentioned.

In a case where other catalysts other than the catalyst composition of the present invention are used in combination, particularly preferred are triethylenediamine and bis(2-dimethylaminoethyl)ether which can increase the reactivity when used in a small amount. Further, the amount to be used is more preferably at most 10 weight % based on the total amount of the catalyst composition.

As the blowing agent to be used for the method for producing a polyester type flexible polyurethane foam of the present invention, water or a low-boiling point organic compound may suitably be exemplified.

The low-boiling point organic compound may, for example, be a low boiling point compound such as a hydrocarbon compound or a halogenated hydrocarbon compound. As the hydrocarbon compound, conventional methane, ethane, propane, butane, pentane or hexane may, for example, be used. As the halogenated hydrocarbon compound, a conventional halogenated methane, halogenated ethane or fluorinated hydrocarbon may, for example, be used, and specifically, e.g. methylene chloride, HCFC-141b (chemical name: 1,1-dichloro-1-fluoroethane), HFC-245fa (chemical name: 1,1,1,3,3-pentafluoropropane) or HFC-365mfc (chemical name: 1,1,1,3,3-pentafluorobutane) may, for example, be used. As such blowing agents to be used, water and low-boiling point organic compounds may be used alone or in combination as a mixture.

In the production method of the present invention, a particularly preferred blowing agent is water.

In the production method of the present invention, the amount of the blowing agent to be used is variable depending upon the desired density of the product and is not particularly limited, but it is usually at least 0.1 part by weight, preferably within a range of from 0.5 to 10 parts by weight, per 100 parts by weight of the polyol.

The surfactant to be used in the production method of the present invention is a conventional organic silicone type surfactant, and is not particularly limited. The amount of the surfactant to be used is usually from 0.1 to 10 parts by weight, preferably from 0.5 to 5 parts by weight, per 100 parts by weight of the polyol.

In the production method of the present invention, a crosslinking agent or a chain extender may be used as the case requires. Such a crosslinking agent or a chain extender may, for example, be a low molecular weight polyhydric alcohol (such as ethylene glycol, 1,4-butanediol or glycerol), a low molecular weight aminepolyol (such as diethanolamine or triethanolamine), or a polyamine (such as ethylenediamine, xylenediamine or methylenebisorthochloroaniline).

In the production method of the present invention, an additive such as a colorant, an flame retardant or an aging-preventive agent, and/or other conventional additives, etc., may be used as the case requires. Types and amounts of the additives may be selected within commonly employed ranges not to depart from conventional format and procedures.

The polyester type flexible polyurethane foam obtainable by the production method of the present invention may be used for various products. The polyester type flexible polyurethane foam obtainable by the production method of the present invention is light in weight and excellent in resiliency, and products using such a foam may, for example, be automobiles, household furniture, bedding, cushions or clothing.

Further, in the present invention, the flexible polyurethane foam is a reversible deformable foam usually having an open cell structure and showing high air permeability, as disclosed in "Polyurethane Handbook" edited by Gunter Oertel (1985 edition, p. 161 to 233, Hanser Publishers (Germany)) or "Polyurethane Resin Handbook" edited by Kenji Iwata (1987 first edition, p. 150 to 221, the Nikkan Kogyo Shimbun, Ltd.). The physical properties of the flexible polyurethane foam are not particularly limited, but usually, the density is within a range of from 10 to 100 kg/m³, the compressive strength (ILD 25%) is from 200 to 8,000 kPa, and the elongation is within a range of from 50 to 500%.

The flexible polyurethane foam of the present invention includes a semi-rigid polyurethane foam from the viewpoint of starting materials to be used and the physical properties of the foam.

As disclosed in "Polyurethane Handbook" edited by Gunter Oertel (1985 edition, p. 223 to 233, Hanser Publishers (Germany)) or "Polyurethane Resin Handbook" edited by Kenji Iwata (1987 first edition, p. 211 to 221, the Nikkan Kogyo Shimbun, Ltd.), the semi-rigid polyurethane foam is a reversible deformable foam having the same open cell structure and high air permeability as in the flexible polyurethane foam though the foam density and the compressive strength are higher than those of the flexible polyurethane foam. Further, the starting materials such as a polyol and an isocyanate to be used are the same as in the flexible polyurethane foam, and therefore a semi-rigid polyurethane foam is classified into a flexible polyurethane foam. The physical properties of the semi-rigid urethane foam are not particularly limited, and usually, the density is within a range of from 40 to 800 kg/m³, the compressive strength (ILD 25%) is within a range of from 10 to 200 kPa, and the elongation is within a range of from 40 to 200%.

EXAMPLES

Now, the present invention will be described with reference to Examples and Comparative Examples, but it should be understood that the present invention is by no means restricted to such Examples.

Examples 1 to 15, Reference Examples 1 to 4 and Comparative Examples 1 to 16

Examples are shown below, wherein polyester type flexible polyurethane foams were produced by using the catalyst compositions of the present invention and the catalysts of Reference Examples and Comparative Examples.

N-Methylpiperazine, N-hydroxyethylmorpholine, N,N-dimethylisopropanolamine and N-hydroxyisopropylmorpholine were blended in the mixed ratios shown in Table 1 to prepare the catalyst compositions C-1 to C-12 of the present invention.

TABLE 1

| Abbreviations of catalysts | Mixed ratios of catalyst (weight ratio) |
|---|---|
| C-1 | NMP[1]/HEM[2] = 90/10 |
| C-2 | NMP/HEM = 75/25 |
| C-3 | NMP/HEM = 50/50 |
| C-4 | NMP/HEM = 25/75 |
| C-5 | NMP/HEM = 10/90 |
| C-6 | NMP/DMIPA[3] = 90/10 |
| C-7 | NMP/DMIPA = 75/25 |
| C-8 | NMP/DMIPA = 50/50 |
| C-9 | NMP/DMIPA = 25/75 |
| C-10 | NMP/DMIPA = 10/90 |

TABLE 1-continued

| Abbreviations of catalysts | Mixed ratios of catalyst (weight ratio) |
|---|---|
| C-11 | NMP/HEM/DMIPA = 1/1/1 |
| C-12 | NMP/HIPM[4] = 1/1 |

[1] N-Methylpiperazine (reagent, manufactured by Wako Pure Chemical Industries, Ltd.)
[2] N-Hydroxyethylmorpholine (reagent, manufactured by Wako Pure Chemical Industries, Ltd.)
[3] N,N-Dimethylisopropanolamine (reagent, manufactured by Wako Pure Chemical Industries, Ltd.)
[4] N-Hydroxyisopropylmorpholine (reagent, manufactured by Tokyo Chemical Industry Co., Ltd.)

Then, a polyester polyol, water, a surfactant, a tin catalyst and toluene diisocyanate were mixed in the mixed ratio of the starting materials, as shown in Table 2, to prepare a premix A.

TABLE 2

| | Parts by weight (pbw) |
|---|---|
| Polyol [5] | 100 |
| Water | 3 to 4 |
| Surfactant A [6] | 0.8 to 1.2 |
| Tin catalyst [7] | 0.1 |
| TDI [8] | Added in an amount of 95 or 112 parts by weight as an isocyanate index [9] |

[5] Nipporan 2200B (polyester polyol (OH value = 61 mgKOH/g), manufactured by Nippon Polyurethane Industry Co., Ltd.)
[6] SE232 (a silicone type surfactant, manufactured by Momentive Performance Materials Inc.)
[7] Tin 2-ethylhexanoate (reagent, manufactured by Wako Pure Chemical Industries, Ltd.)
[8] T-80 (toluene diisocyanate, manufactured by Nippon Polyurethane Industry Co., Ltd.)
[9] Isocyanate index = (moles of NCO groups/moles of OH groups) × 100

523 g of the above premix A was put in a 1,000 ml polyethylene cup, and further the catalyst compositions C-1 to C-12 of the present invention and the catalysts in Reference Examples and Comparative Examples were added in such amounts that each reactivity would be 85±10 seconds as a rise time as mentioned below, followed by adjusting the temperature to 25° C.

Further, a polyisocyanate liquid (T-80) having the temperature adjusted to 25° C. in a separate container, was put in the cup of the above premix A in such an amount that the isocyanate index {isocyanate groups/OH groups (molar ratio)× 100} would be 95, followed by quick stirring at 9,000 rpm for 10 seconds by a stirrer. The mixed liquid thus mixed and stirred, was transferred to a mold (made of aluminum with an inner dimension of 25 cm×25 cm×25 cm) adjusted to a temperature of 25° C. so that a certain number of foams necessary for evaluation was molded, followed by confirming the reactivity in foaming, the foam formability, the odor of the foam and VOC (volatile organic compound) of the foam.

Then, with respect to catalyst compositions showing good results in the foam formability, the starting materials were scaled up, and by a similar operation, the mixed liquid having an isocyanate index {isocyanate groups/OH groups (molar ratio)×100} of 112 was transferred to a mold (wooden made, with an inner dimension of 50 cm×50 cm×50 cm) adjusted to a temperature of 25° C., followed by foaming. The foam was removed from the mold exactly 30 minutes after the mixed liquid was poured, whereby a foam was obtained. The interior scorches (burning) in the foams, of the above made foams, were measured to compare them.

Further, regarding the catalyst compositions in Examples, the processability (handling) and the odor of the catalyst were measured and compared. Further, regarding the catalytic activity, the strength/weakness of the catalytic activity was judged from the amount of the catalyst obtained by the above studies.

The results of Examples 1 to 15, Reference Examples 1 to 4 and Comparative Examples 1 to 16 are shown in Tables 3 to 8.

TABLE 3

|  | Example 1 | Example 2 | Example 3 | Example 4 | Example 5 | Example 6 | Example 7 |
|---|---|---|---|---|---|---|---|
| Amount of catalyst (pbw) | | | | | | | |
| NMP[1] | 1.00 | | | | | | |
| C-1 | | 1.07 | | | | | |
| C-2 | | | 1.15 | | | | |
| C-3 | | | | 1.59 | | | |
| C-4 | | | | | 2.15 | | |
| C-5 | | | | | | 2.90 | |
| HEM[2] | | | | | | | 3.50 |
| Reactivity (sec.) | | | | | | | |
| Cream time | 14 | 14 | 14 | 13 | 13 | 12 | 12 |
| Rise time | 92 | 95 | 97 | 93 | 94 | 87 | 88 |
| Physical property of foam | | | | | | | |
| Formability of foam[3] | ◎ | ◎ | ◎ | ◎ | ◎ | ◎ | ◎ |
| Odor of foam[3] | ◎ | ◎ | ◎ | ◎ | ◎ | ◎ | ◎ |
| Scorch property of foam[3] | ◎ | ◎ | ◎ | ◎ | ○ | ○ | ○ |
| VOC in foam (μg/g)[4] | n.d. | n.d. | 2 | 6 | 11 | 18 | 25 |
| Catalytic activity | ◎ | ◎ | ◎ | ◎ | ○ | Δ | X |
| Odor of catalyst | Δ | ○ | ◎ | ◎ | ◎ | ◎ | ◎ |
| Operation efficiency (handling efficiency) | X | Δ | ○ | ◎ | ◎ | ◎ | ◎ |

[1] N-Methylpiperazine (reagent, manufactured by Wako Pure Chemical Industries, Ltd.)
[2] N-Hydroxyethylmorpholine (reagent, manufactured by Wako Pure Chemical Industries, Ltd.)
[3] An aluminum-made mold (25 cm × 25 cm × 25 cm) was used.
[4] A wooden mold (50 cm × 50 cm × 50 cm) was used.
n.d. = less than minimum limit of determination

TABLE 4

|  | Example 8 | Example 9 | Example 10 | Example 11 | Example 12 | Example 13 |
|---|---|---|---|---|---|---|
| Amount of catalyst (pbw) | | | | | | |
| C-6 | 0.99 | | | | | |
| C-7 | | 0.97 | | | | |
| C-8 | | | 0.95 | | | |
| C-9 | | | | 0.93 | | |
| C-10 | | | | | 0.91 | |
| DMIPA[1] | | | | | | 0.90 |
| Reactivity (sec.) | | | | | | |
| Cream time | 13 | 14 | 14 | 15 | 14 | 13 |
| Rise time | 91 | 92 | 89 | 85 | 81 | 76 |
| Physical property of foam | | | | | | |
| Formability of foam[2] | ◎ | ◎ | ◎ | ◎ | ◎ | ◎ |
| Odor of foam[2] | ◎ | ◎ | ◎ | ◎ | ○ | ○ |
| Scorch property of foam[2] | ◎ | ◎ | ◎ | ◎ | ◎ | ◎ |
| VOC in foam (μg/g)[3] | 21 | 51 | 100 | 146 | 172 | 189 |
| Catalytic activity | ◎ | ◎ | ◎ | ◎ | ◎ | ◎ |
| Odor of catalyst | ○ | ○ | ○ | ○ | Δ | X |
| Operation efficiency (handling efficiency) | Δ | ○ | ◎ | ◎ | ◎ | ○ |

[1] N,N-Dimethylisopropanolamine (reagent, manufactured by Wako Pure Chemical Industries, Ltd.)
[2] An aluminum-made mold (25 cm × 25 cm × 25 cm) was used.
[3] A wooden mold (50 cm × 50 cm × 50 cm) was used.
n.d. = less than minimum limit of determination

TABLE 5

|  | Example 14 | Example 15 |
|---|---|---|
| Amount of catalyst (pbw) | | |
| C-11 | 1.25 | |
| C-12 | | 1.67 |
| Reactivity (sec.) | | |
| Cream time | 14 | 13 |
| Rise time | 89 | 96 |
| Physical property of foam | | |
| Formability of foam[1] | ◎ | ◎ |
| Odor of foam[1] | ◎ | ◎ |
| Scorch property of foam[1] | ◎ | ○ |
| VOC in foam (μg/g)[2] | 90 | 3 |
| Catalytic activity | ◎ | ◎ |

TABLE 5-continued

|  | Example 14 | Example 15 |
|---|---|---|
| Odor of catalyst | ◎ | ◎ |
| Operation efficiency (handling efficiency) | ◎ | ◎ |

[1] An aluminum-made mold (25 cm × 25 cm × 25 cm) was used.
[2] A wooden mold (50 cm × 50 cm × 50 cm) was used.

TABLE 6

|  | Reference Example 1 | Reference Example 2 | Reference Example 3 | Reference Example 4 |
|---|---|---|---|---|
| Amount of catalyst (pbw) | | | | |
| NMP[1] | 0.59 | | | |
| HEM[2] | | 1.25 | 0.93 | |
| DMIPA[3] | | | | 0.62 |
| MHEP[4] | 0.29 | 0.42 | | 0.21 |
| DMAPA[5] | | | 0.31 | |

TABLE 6-continued

|  | Reference Example 1 | Reference Example 2 | Reference Example 3 | Reference Example 4 |
|---|---|---|---|---|
| Reactivity (sec.) | | | | |
| Cream time | 15 | 14 | 13 | 16 |
| Rise time | 87 | 80 | 84 | 76 |
| Physical property of foam | | | | |
| Formability of foam[6] | ◎ | ◎ | X | ◎ |
| Odor of foam[6] | ◎ | ◎ | ◎ | ○ |
| Scorch property of foam[6] | X | X | — | Δ |

[1] N-Methylpiperazine (reagent, manufactured by Wako Pure Chemical Industries, Ltd.)
[2] N-Hydroxyethylmorpholine (reagent, manufactured by Wako Pure Chemical Industries, Ltd.)
[3] N,N-Dimethylisopropanolamine (reagent, manufactured by Wako Pure Chemical Industries, Ltd.)
[4] 10 wt % N-methyl-N'-hydroxyethylpiperazine aqueous solution (TOYOCAT-HPW, manufactured by TOSOH CORPORATION)
[5] N,N-Dimethyl-1,3-propanediamine (reagent, manufactured by Wako Pure Chemical Industries, Ltd.)
[6] An aluminum-made mold (25 cm × 25 cm × 25 cm) was used.

TABLE 7

|  | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 |
|---|---|---|---|---|---|---|---|---|
| Amount of catalyst (pbw) | | | | | | | | |
| NEM[1] | 1.50 | | | | | | | |
| TEDA[2] | | 0.48 | | | | | | |
| DMP[3] | | | 0.40 | | | | | |
| DMI[4] | | | | 0.50 | | | | |
| MHEP[5] | | | | | 0.65 | | | |
| DMAPA[6] | | | | | | 0.42 | | |
| DMAPA-2PO[7] | | | | | | | 0.75 | |
| DMEA[8] | | | | | | | | 0.60 |
| Reactivity (sec.) | | | | | | | | |
| Cream time | 14 | 17 | 16 | 17 | 17 | 16 | 18 | 13 |
| Rise time | 85 | 84 | 80 | 83 | 90 | 86 | 90 | 75 |
| Physical property of foam | | | | | | | | |
| Formability of foam[9] | ◎ | X | ○ | ◎ | ○ | X | X | ◎ |
| Odor of foam[9] | X | Δ | Δ | Δ | ◎ | ◎ | ◎ | Δ |
| Scorch property of foam[9] | ○ | — | ◎ | ◎ | X | — | — | Δ |
| VOC in foam (μg/g)[10] | 1485 | 959 | 695 | 1050 | 13 | n.d. | n.d. | 282 |

[1] N-Ethylmorpholine (reagent, manufactured by Wako Pure Chemical Industries, Ltd.)
[2] A dipropylene glycol solution containing 33.3 wt % of triethylenediamine (TEDA-L33, manufactured by TOSOH CORPORATION)
[3] N,N'-Dimethylpiperazine (reagent, manufactured by Wako Pure Chemical Industries, Ltd.)
[4] Ethylene glycol solution containing 70 wt % of 1,2-dimethylimidazole (TOYOCAT-DM70, manufactured by TOSOH CORPORATION)
[5] 10 wt % N-methyl-N'-hydroxyethylpiperazine aqueous solution (TOYOCAT HPW, manufactured by TOSOH CORPORATION)
[6] N,N-Dimethyl-1,3-propanediamine (reagent, manufactured by Wako Pure Chemical Industries, Ltd.)
[7] N,N-Dimethyl-N',N'-bis(hydroxypropyl)propanediamine (synthesized product)
[8] N,N-Dimethylaminoethanol (reagent, manufactured by Wako Pure Chemical Industries, Ltd.)
[9] An aluminum-made mold (25 cm × 25 cm × 25 cm) was used.
[10] A wooden mold (50 cm × 50 cm × 50 cm) was used.
n.d. = less than minimum limit of determination

TABLE 8

|  | Comp. Ex. 9 | Comp. Ex. 10 | Comp. Ex. 11 | Comp. Ex. 12 | Comp. Ex. 13 | Comp. Ex. 14 | Comp. Ex. 15 | Comp. Ex. 16 |
|---|---|---|---|---|---|---|---|---|
| Amount of catalyst (pbw) | | | | | | | | |
| DMHA[1] | 0.50 | | | | | | | |
| DMAEEE[2] | | 0.70 | | | | | | |
| 2MIZPO[3] | | | 0.65 | | | | | |
| TMHEAEE[4] | | | | 0.30 | | | | |
| Bis-DMAPIPA[5] | | | | | 0.46 | | | |
| MDMAPAE[6] | | | | | | 0.50 | | |

TABLE 8-continued

|  | Comp. Ex. 9 | Comp. Ex. 10 | Comp. Ex. 11 | Comp. Ex. 12 | Comp. Ex. 13 | Comp. Ex. 14 | Comp. Ex. 15 | Comp. Ex. 16 |
|---|---|---|---|---|---|---|---|---|
| IBDMPA[7] | | | | | | | 0.60 | |
| DMAPU, BDMAPU[8] | | | | | | | | 0.74 |
| Reactivity (sec.) | | | | | | | | |
| Cream time | 16 | 17 | 19 | 12 | 13 | 13 | 13 | 14 |
| Rise time | 91 | 88 | 94 | 93 | 76 | 79 | 85 | 94 |
| Physical property of foam | | | | | | | | |
| Formability of foam[9] | X | X | Δ | Δ | X | X | X | X |
| Odor of foam[9] | ○ | ○ | ○ | ◎ | ◎ | ◎ | ◎ | ◎ |
| Scorch property of foam[9] | — | — | ◎ | — | — | — | — | — |
| VOC in foam (μg/g)[10] | n.d. | 13 | 312 | n.d. | 14 | 30 | n.d. | 481 |

[1] N,N-Dimethylaminohexanol (KAOLIZER No. 25, manufactured by Kao Corporation)
[2] N,N-Dimethylaminoethoxyethoxyethanol (synthesized product)
[3] 20 wt % 1-(2-hydroxypropyl)-2-methylimidazole aqueous solution (synthesized product)
[4] N,N,N'-Trimethyl-N'-hydroxyethyl-bisaminoethyl ether (JEFFCAT-ZF10, manufactured by Huntsman International LLC.)
[5] N,N-Bis(3-dimethylaminopropyl)-N-isopropanolamine (JEFFCAT-ZR50, manufactured by Huntsman International LLC.)
[6] N-Methyl-N-(dimethylaminopropyl)aminoethanol (synthesized product)
[7] Bis(3-dimethylaminopropyl)amine (reagent, manufactured by Sigma-Aldrich Corporation)
[8] A mixture of 3-dimethylaminopropyl urea (80 to 90 wt %) and bis(3-dimethylaminopropyl)urea (10 to 25 wt %) (synthesized product)
[9] An aluminum-made mold (25 cm × 25 cm × 25 cm) was used.
[10] A wooden mold (50 cm × 50 cm × 50 cm) was used.
n.d. = less than minimum limit of determination Further, the measurement methods for the respective measured items were as follows.

(1) Measured items for reactivity (sec.)

Cream time: Foam initiating time, the time when the foam started to rise was visually measured.

Rise time: The time when the rise of the foam stopped, was measured by a laser displacement sensor (Model: LF-2510, manufactured by KEYENCE Corporation) (see FIG. 1).

(2) Measured items for foam property

Foam formability: A foam made by an aluminum-made mold was aged for one week, and then visually observed to evaluate the formability as follows:

◎: No shrinkage and deformation observed (shrinkage rate=0%).

○: shrinkage and deformation slightly observed (shrinkage rate=less than 5%).

Δ: Shrinkage and deformation observed (shrinkage rate=5 to 20%).

×: Remarkable shrinkage and deformation observed (shrinkage rate=at least 20%).

Here, the shrinkage rate is a volume change of a foam before and after a formability test.

Odor of foam: A foam made by a wooden mold was aged for one week, then a center portion of the made foam was cut, and 10 monitoring people smelled the cut portion to evaluate the strength of odor as follows:

◎: Odor not substantially sensed.

○: Odor slightly sensed.

Δ: Odor sensed.

×: Strong odor sensed.

Scorch property of foam: A foam made by a wooden mold was aged for one week, then a center portion of the made foam was cut, and a cross section thereof was visually observed to evaluate scorching as follows. Color expression was based on the expression in accordance with WS 28102 "color of object".

◎: No discoloration in the form observed (extremely pale yellowish white).

○: Discoloration in the form slightly observed (pale yellowish white).

Δ: Discoloration in the form observed (deep yellowish white).

×: Remarkable discoloration in the form observed (pale yellowish yellow).

—: It was impossible to evaluate the scorch property due to bad foam formability.

Figure 2:
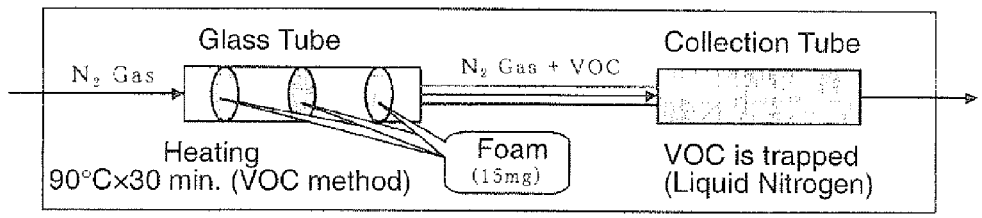
FIG. 2 is a schematic view illustrating a method of measuring a VOC amount of a foam in Examples of the present invention.
Figure 2:
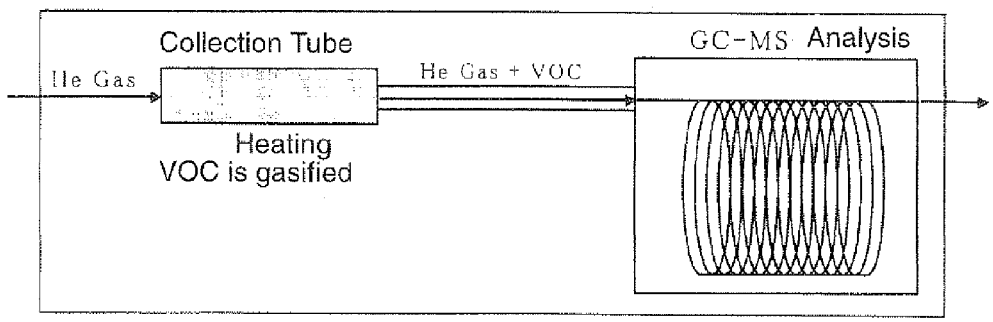

VOC amount in foam: A foam made by an aluminum-made mold was aged for one day, then its surface portion was cut, and a foam sample (15 mg) obtained was heated at 90° C. for 30 minutes by a Thermal Desorption Spectroscopy (TDS: manufactured by Gerstel K.K., type: TDS-2A) to eliminate VOC in the foam, followed by collecting it by a collection tube (see FIG. 2(1)). Then, this collection tube was heated, and VOC gas was injected into a gas chromatograph mass spectrometer (GC/MS: manufactured by Agilent Technologies, Inc., type: JP6890/5973) to measure the VOC amount (see FIG. 2(2)). Such a measurement value was calculated to the amount of VOC eliminated from 1 g of the foam.

Here, in Tables, "n.d." means that the VOC amount is less than the minimum limit of determination.

(3) Catalytic activity: The catalyst composition of the present invention and catalysts in Comparative Examples were adjusted so that each reactivity has a rise time of 85±10 seconds, and the amount to be used was obtained, followed by carrying out evaluation from the viewpoint of the amount of the catalyst, as shown below:

◎: Activity was strong (amount of catalyst used=less than 2.0 pbw).

○: Activity was sufficient (amount of catalyst used=2.0 to 2.5 pbw).

Δ: Activity was weak (amount of catalyst used=2.5 to 3.0 pbw).

×: Activity was very weak (amount of catalyst used=at least 3.0 pbw).

(4) Odor of catalyst: 1 g of a catalyst was charged in a glass bottle having an inner volume of 30 cc, and 10 monitoring people smelled odor thereof to evaluate the strength of the odor as follows:

◎: Odor not substantially sensed.

○: Odor slightly sensed.

Δ: Odor sensed.

×: Strong odor sensed.

(5) Operation efficiency (handling efficiency): By taking the above evaluations of (3) catalytic activity and (4) odor of catalyst into consideration, the handling efficiency of the catalyst was evaluated as follows:

⊚: Handling was easily carried out.

○: Handling was normally carried out.

Δ: Attention was needed to handling.

×: Handling was difficult.

As is evident from Examples 1 to 15, the polyester type flexible polyurethane foam employing the catalyst composition of the present invention is excellent in the foam formability, and scorching in the interior of the foam was not substantially observed. Further, odor of the foam was not substantially sensed, and the VOC amount was small. Further, the polyester type flexible polyurethane slab foams in Examples 3 to 5, Examples 9 to 11, Example 14 and Example 15 were excellent in operation efficiency (handling), the catalytic activity was high, and odor of the catalyst was little.

On the other hand, Comparative Examples 1 to 4 and Comparative Example 16 are Examples in which a tertiary amine compound having no reactive groups in its molecule. In Comparative Examples 1 to 4, a catalyst of a volatile amine compound was discharged from a foam, whereby odor was sensed. In Comparative Example 16, the foam was shrunk and deformed, and the formability was deteriorated.

Further, Comparative Examples 5 to 15 are examples in which an amine compound having a primary amino group and a secondary amino group or a hydroxyalkyl group, reactive with a polyisocyanate in its molecule was singly used as a catalyst, but in Comparative Examples 5 and 8, scorching occurred to a foam. Further, in Comparative Examples 6, 7 and 9 to 15, the foam was shrunk and deformed, and the formability was deteriorated.

Further, Reference Examples 1 to 4 are examples in which an amine compound to be used for the catalyst composition of the present invention, and as such another catalyst, an amine compound having a primary and secondary amino groups or a hydroxyalkyl group in its molecule, were used. Specifically, as such another catalyst, a mixture with the amine compound (scorching occurred to a foam) used in Comparative Example 5 or the amine compound (a foam was shrunk and deformed) used in Comparative Example 6 was used. The amount of such another catalyst exceeds 10 wt % based on the total amount of the catalyst composition, and therefore in Reference Examples 1, 2 and 4, scorching occurred to the foam, as in Comparative Example 5. Further in Reference Example 3, the foam is shrunk and deformed, and the formability was deteriorated, as in Comparative Example 6. As is evident from these Reference Examples, in a case where another catalyst other than the catalyst composition of the present invention is used in combination, it is necessary to use it within a range not to depart from the present invention, and it is undesirable to use a large amount of such another catalyst.

Industrial Applicability

A polyester type flexible polyurethane foam obtained by using the catalyst composition of the present invention is excellent in the foam formability and free from scorching in the interior of the foam, and further discharges substantially no volatile amine compound and thus has a low odor, and therefore it is possible to use the foam for products such as automobiles, household furniture, bedding, cushion or clothing.

The entire disclosure of Japanese Patent Application No. 2007-279243 filed on Oct. 26, 2007 including specification, claims, drawings and summary is incorporated herein by reference in its entirety.

The invention claimed is:

1. A method for producing a flexible polyurethane foam, which comprises reacting a polyester polyol with a polyisocyanate, in the presence of a catalyst composition containing:
   (1) N-Methylpiperazine
   (2) an amine compound selected from at least one of N-Hydroxyethylmorpholine, N,N-Dimethylisopropanolamine and/or N-Hydroxyisopropylmorpholine;
   a blowing agent; and a surfactant.

2. The method for producing a flexible polyurethane foam according to claim 1, wherein the catalyst composition is a catalyst composition containing the amine compound of (1) and the amine compound of (2), and a mixed ratio thereof is (1)/(2) 20/80 to 80/20 (weight ratio).

3. A method for producing a flexible polyurethane foam, which comprises reacting a polyester polyol with a polyisocyanate, in the presence of a catalyst composition containing N-Methylpiperazine and at least one of N-Hydroxyethylmorpholine, N,N-Dimethylisopropanolamine or N-Hydroxyisopropylmorpholine.

* * * * *